United States Patent Office 2,871,339
Patented Jan. 27, 1959

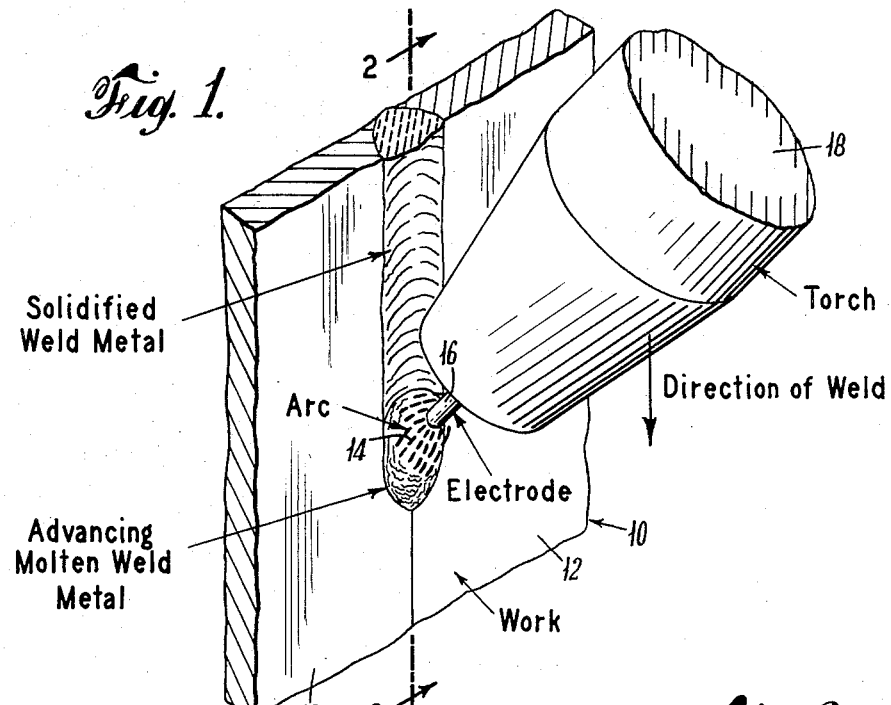
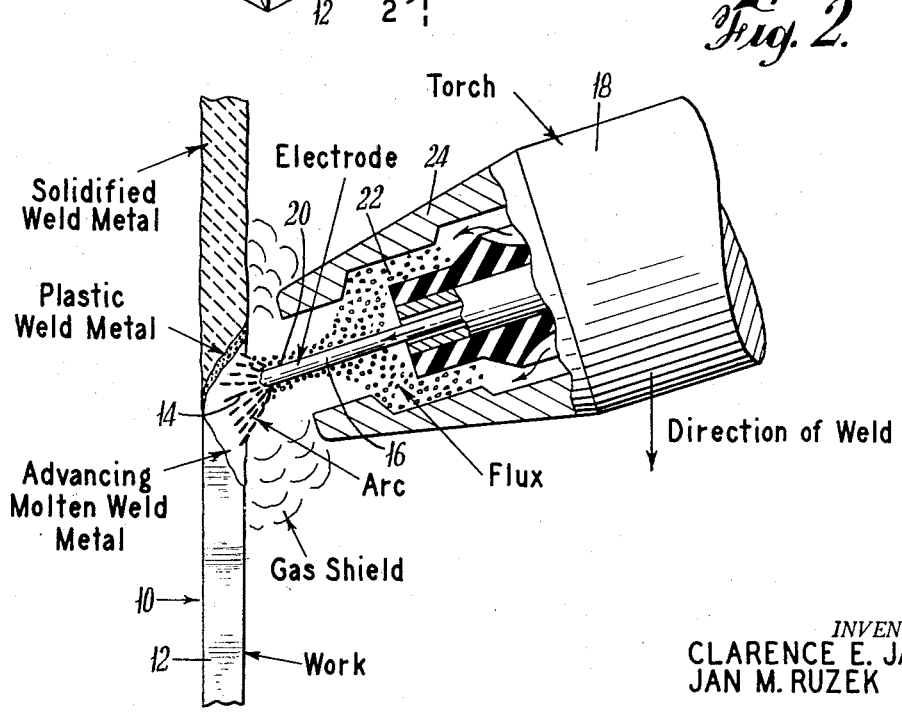

2,871,339

ELECTRIC ARC WELDING

Clarence E. Jackson, Berkeley Heights, N. J., and Jan M. Ruzek, Niagara Falls, N. Y., assignors to Union Carbide Corporation, a corporation of New York Application April 23, 1957, Serial No. 654,486

2 Claims. (Cl. 219—137)

This invention relates to gas shielded electric arc welding, and more particularly to "position" welding.

According to the present invention there is provided a gas shielded electric arc welding process which comprises arranging the work to be welded so that a puddle of molten metal formed by a welding arc will tend to flow downwardly under the force of gravity. A stream of arc shielding gas is discharged toward such work, and a welding arc is energized in such stream between such work and an electrode to melt a puddle of weld metal. The work on the one hand is then relatively moved with respect to the puddle, gas stream, electrode, and arc on the other hand, so that a continuous weld is made, characterized in that the gravitational flow of the molten metal of such puddle acts to cushion the arc force resulting from the selected arc current.

The submerged-arc process is the principal welding method employed for the mass fabrication of light (14-gage) steel. Welding speeds of the order of 100 to 200 inches per minute have been reached. Prior attempts to increase such speeds by employing different fluxes, as well as other expedients, have met with little success.

The present invention concerns a method of welding light-gage steel at rates more than twice the speeds heretofore obtained. This is accomplished preferably by the magnetic flux welding process disclosed by Harry E. Kennedy in his application Serial No. 481,906, filed January 14, 1955, and advancing the welding puddle downwardly, with the workpiece either in an inclined or vertical position with respect to the horizontal. The normal difficulty of delivering and holding granular flux at the arc zone in "position" welding is not present in welding by such Kennedy magnetic flux process, since the powdered welding composition in such process is carried to the arc zone by its magnetic attraction to the electrode.

Vertical down welding according to the invention is also effective for increasing welding speeds in gas shielded arc welding. Somewhat lower speeds are obtained when only an inert gas is the arc shielding medium, since at very high speeds the gas would be dispersed. In general, however, the normal welding speeds obtained when welding in a horizontal position may be approximately doubled by welding in accordance with the present invention.

The higher speeds are made possible when welding downwardly in a vertical or inclined position according to the invention by virtue of the liquid metal in the weld puddle remaining under the arc, as a result of its gravitational flow, instead of being moved backward away from the arc, as is the case in horizontal welding. The liquid metal thus acts to cushion the force of the arc and overcome the backward pumping action of the arc at the higher currents employed, thereby preventing direct contact of the arc with solid metal.

In the drawings:

Fig. 1 is a fragmentary perspective view of a vertical weld being made according to the invention with a Kennedy process-type torch; and Fig. 2 is a vertical cross-sectional view taken on line 2—2 of Fig. 1.

As shown in the drawing the work 10 in the form of vertically abutting sheets 12, 12 is welded by drawing a welding arc 14 between such work and wire electrode 16 that is fed through a torch 18, picking up a coating 20 of magnetic flux powder that is delivered to the terminal position of the electrode in an annular stream 22 of arc shielding gas through a nozzle 24 of such torch. The torch 18 is slightly inclined downwardly and moved rapidly from the top to the bottom of the vertical seam to be welded.

It is understood that the relative motion of the torch and work can be obtained by moving the torch from the top to the bottom of the seam, or by raising the work so that a stationary torch "travels" relatively downward along the seam. Such an arrangement with a stationary torch permits the welding of long lengths of skelp to form pipe in a vertical mill. Shorter work units may be handled in a similar manner by passing them through a jig in a vertical direction past a stationary torch.

High currents and lineal welding speeds of the order of 500 amperes (D. C.-R. P.), and at least 400 inches per minute, respectively, are conditions under which acceptable lap and butt welds are produced by the invention with the Kennedy process on 14-gage steel, using a 3/32-inch diameter electrode, both in inclined and vertical position welding. In general, it is necessary to use a high (1.5) flux-to-electrode ratio to provide ample slag coverage for the weld metal, as well as good bead appearance.

In applying the Kennedy process of welding according to the present invention, care must be exercised to coordinate the proper flux-to-electrode ratio, welding current, welding speed, electrode diameter, and melting rate to produce welds that are continuous and have good appearance. The proper combination of such welding factors is important since the use of higher currents to increase the amount of metal deposited without, for instance, increasing the electrode diameter, may result in molten metal being ejected from the arc area by the force of the arc. Acceptable welds may be produced on 14-gage steel with a 3/32-inch diameter electrode by welding at from 480 to 520 amperes, 20 to 24 volts, at lineal welding speeds of at least up to 400 inches per minute, with the workpiece in either an inclined or vertical position.

The proper conditions for welding according to the invention in a vertical or down position by the sigma (shielded-inert-gas-metal-arc) and refractory electrode inert gas-shielded arc processes are also important. In such gas-shielded welding processes, the rate of gas flow is of paramount significance in the present invention. Increase in travel speed should be accompanied by a corresponding increase in gas flow rate to ensure adequate protection of the molten metal from the atmosphere.

*Typical examples*

I

Welding conditions in practicing the invention for a lap weld and butt weld are given below. In each case, the weld was made by the Kennedy process on 14-gage mild steel sheet with the workpiece in a vertical position. In both instances, a continuous bead was deposited and the weld was of acceptable quality.

| | Lap Weld | Butt Weld |
|---|---|---|
| Amperes (D. C.-R. P.) | 500 | 500 |
| Volts | 23 | 21 |
| Electrode inches | 3/32 | 3/32 |
| Flux-to-Electrode Ratio | 1.5 | 1.5 |
| Welding Speed I. P. M. | 400 | 400 |

Conditions similar in every respect except that the welds were deposited horizontally according to the prior art indicated that continuous welds could not be produced at speeds above 70 I. P. M.

II

Circular beads were deposited on a rotating 3/16-inch mild steel plate with a stationary inert-gas shielded tungsten-arc welding torch, wherein the work was perpendicular to the horizontal and the welding action moved downward. A 1/8-inch diameter thoriated tungsten electrode was employed at 400 amperes, 16½ to 17 volts (D. C.–S. P), with argon being fed at 35 C. F. H. Under such conditions, continuous and sound beads were deposited at 52 I. P. M., and continuous but slightly undercut beads were made up to 63 I. P. M.

Conditions similar in every respect except that the welds were deposited horizontally according to the prior art indicated that continuous welds could not be produced at speeds above 30 I. P. M.

What is claimed is:

1. Gas-shielded electric arc welding process which comprises arranging the work to be welded so that a puddle of molten weld metal formed by a welding arc will tend to flow downwardly under the force of gravity, discharging a stream of arc shielding gas toward the work, energizing a welding arc in such stream between such work and an electrode, melting a puddle of weld metal with such arc, and relatively moving the work on the one hand with respect to the puddle, gas stream, electrode, and arc on the other hand, so that a continuous weld is made, characterized in that the gravitational flow of the molten metal of such puddle acts to cushion the arc force resulting from the selected arc current.

2. Welding process as defined by claim 1, in which magnetic flux powder is carried by such gas stream and so attracted to the terminal portion of such wire that an adherent covering of powder continuously forms thereon, the flux powder-to-electrode ratio being of the order of 1.5 to provide ample slag coverage for the weld metal as well as good bead appearance.

References Cited in the file of this patent

UNITED STATES PATENTS

| 2,591,926 | Gibson et al. | Apr. 8, 1952 |
| 2,669,640 | Outcalt et al. | Feb. 16, 1954 |

FOREIGN PATENTS

| 608,270 | Great Britain | Sept. 13, 1948 |